(12) United States Patent
Ogawa et al.

(10) Patent No.: US 7,453,780 B2
(45) Date of Patent: Nov. 18, 2008

(54) INFORMATION RECORDING MEDIUM, INFORMATION RECORDING/REPRODUCING APPARATUS AND INFORMATION MANAGEMENT METHOD

(75) Inventors: Akihito Ogawa, Kawasaki (JP); Hiroharu Satoh, Tokyo (JP); Chosaku Noda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 650 days.

(21) Appl. No.: 11/190,853

(22) Filed: Jul. 28, 2005

(65) Prior Publication Data

US 2006/0023596 A1 Feb. 2, 2006

(30) Foreign Application Priority Data

Jul. 30, 2004 (JP) .............................. 2004-224486

(51) Int. Cl.
*G11B 7/00* (2006.01)
(52) U.S. Cl. .................................. 369/53.21; 369/59.23
(58) Field of Classification Search .............. 369/53.21, 369/47.13, 47.553, 59.23, 59.24
See application file for complete search history.

(56) References Cited

U.S. PATENT DOCUMENTS

| | | | | |
|---|---|---|---|---|
| 6,091,698 A | * | 7/2000 | Hogan | 369/275.2 |
| 6,671,249 B2 | * | 12/2003 | Horie | 369/53.21 |
| 6,834,034 B2 | * | 12/2004 | Yokokawa | 369/53.22 |
| 2002/0114239 A1 | | 8/2002 | Yokokawa | |

FOREIGN PATENT DOCUMENTS

| | | |
|---|---|---|
| JP | 5-151574 | 6/1993 |
| JP | 5-224761 | 9/1993 |
| JP | 2002-183964 | 6/2002 |
| JP | 2003-59050 | 2/2003 |
| JP | 2003-281824 | 10/2003 |

* cited by examiner

*Primary Examiner*—Thang V Tran
(74) *Attorney, Agent, or Firm*—Oblon, Spivak, McClelland, Maier & Neustadt, P.C.

(57) ABSTRACT

There is provided an information management apparatus which can make it impossible to read out data recorded on a write-once type recordable optical disk as required and the usefulness thereof is enhanced. When recorded data is destroyed on the write-once type recordable optical disk, data modulated by a modulation system of the same run length restriction as run length restriction of a modulation system used for recording data is overwritten and recorded, data is overwritten and recorded by use of patterns in which the frequency of occurrence of spaces of the longest code is higher than the frequency of occurrence of the modulation system used for recording data, or data is overwritten and recorded by use of successive patterns of the shortest code in the run length restriction of the modulation system used for recording data.

13 Claims, 12 Drawing Sheets

FIG. 12A
Recording once

FIG. 12B
Random recording

FIG. 12C
11T pattern recording

FIG. 12D
2T pattern recording

FIG. 13

| Sector number | PI ERROR |
|---|---|
| 0 | 13 |
| 1 | 0 |
| 2 | 13 |
| 3 | 0 |
| 4 | 13 |
| 5 | 0 |
| 6 | 13 |
| 7 | 0 |
| 8 | 13 |
| 9 | 0 |
| 10 | 13 |
| 11 | 0 |
| 12 | 13 |
| 13 | 0 |
| 14 | 13 |
| 15 | 0 |
| 16 | 13 |
| 17 | 0 |
| 18 | 13 |
| 19 | 0 |
| 20 | 13 |
| 21 | 0 |
| 22 | 13 |
| 23 | 0 |
| 24 | 13 |
| 25 | 0 |
| 26 | 13 |
| 27 | 0 |
| 28 | 13 |
| 29 | 0 |
| 30 | 13 |
| 31 | 0 |

FIG. 14

INFORMATION RECORDING MEDIUM, INFORMATION RECORDING/REPRODUCING APPARATUS AND INFORMATION MANAGEMENT METHOD

CROSS-REFERENCE TO RELATED APPLICATIONS

This application is based upon and claims the benefit of priority from prior Japanese Patent Application No. 2004-224486, filed Jul. 30, 2004, the entire contents of which are incorporated herein by reference.

BACKGROUND OF THE INVENTION

1. Field of the Invention

This invention relates to an information recording medium, information recording/reproducing apparatus and information management method and can be effectively applied to a write-once type recordable optical disk and a recording/reproducing apparatus thereof.

2. Description of the Related Art

As a technique relating to a write-once type recordable optical disk and a recording/reproducing apparatus thereof, the technique described in Jpn. Pat. Appln. KOKAI Publication No. H5-224761 is provided. In this case, as a method for managing recording data, a technique for providing a delete flag on the optical disk and making it possible to simulatively delete data is disclosed. With the above technique, when it is desired to inhibit a data read operation, a delete flag is written into a header information area containing the above data. Then, if the delete flag in the header information is detect at data read time, the process of reading data in a file containing the delete flag is inhibited.

However, in the above prior art technique, data recorded on the optical disk actually remains on the disk even after erasing. Therefore, if an apparatus which is configured to ignore the delete flag is used, recorded data can be read and it is difficult to use the optical disk as a medium on which data of confidential documents and the like is written.

BRIEF SUMMARY OF THE INVENTION

An object of the embodiments is to provide an information recording medium, information recording/reproducing apparatus and information management method which make it impossible to read out recorded data even in a write-once type recordable medium so as to enhance the usefulness thereof.

In order to solve the above problem, in a write-once type recordable optical disk according to one embodiment, data which is already recorded is destroyed by overwriting data modulated in a modulation system with the same run length restriction as the run length restriction used in a modulation system for recording data.

According to the above method, data which has been erased once cannot be reproduced any more. Therefore the safety in erasing confidential information or the like is significantly enhanced. Further, since a servo signal can be attained even after data destruction, data before or after erased data can be safely read after data is partially erased. Generally, when data recorded on a write-once type recordable disk is overwritten, there occurs a problem that pits on the disk are destroyed and a tracking servo signal such as a DPD signal cannot be obtained. However, with the method of this invention, a tracking servo signal can be attained even after a signal is overwritten by imposing a restriction on the pattern of the signal to be overwritten.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described embodiments of this invention with reference to the accompanying drawings.

Figure 1:
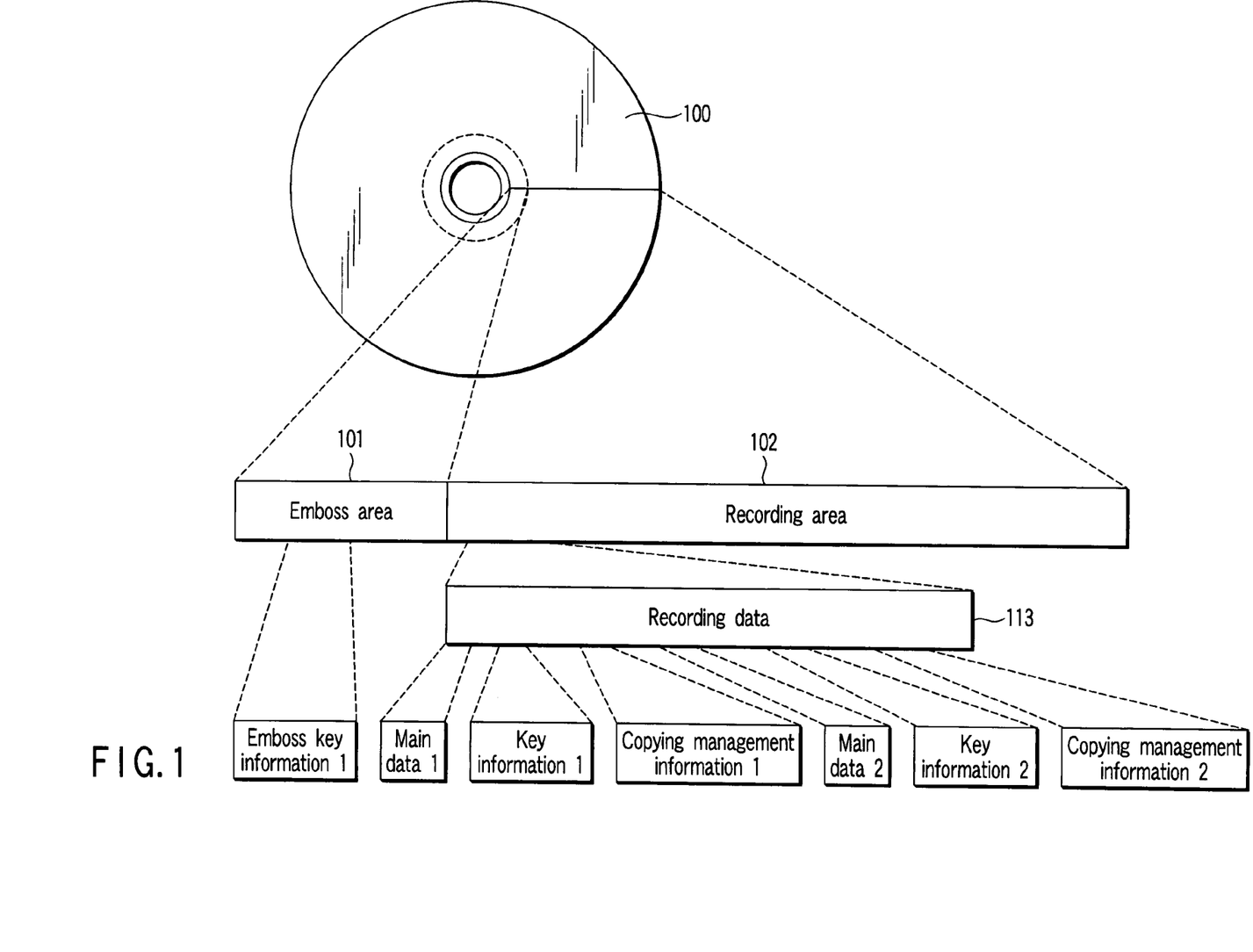
FIG. 1 is an explanatory view showing an optical disk with which information can be recorded or reproduced according to one embodiment of this invention.

Explanation for Optical Disk:

In FIG. 1, an optical disk 100 on or from which information can be recorded or reproduced according to one embodiment of this invention is shown. Information can be recorded or reproduced with respect to the optical disk 100 by forming an information recording layer on a transparent substrate and condensing laser light on the information recording layer. A recording material such as an organic coloring material, multi-layered inorganic material is used to form the information recording layer. Recording pits or marks are formed by condensing high power laser light on the information recording layer to record information on the optical disk 100. Further, an information recording/reproducing layer of the recordable optical disk 100 has an emboss area and recording area 102 in which information is previously recorded.

Guide grooves such as grooves and physical address information are previously formed in the recording area 102 and access is made to a desired location to record information. In the recording area 102, recording data 113 such as user data is recorded. Further, in the optical disk 100 of this invention, for simplification of a process for erasing or protecting main data, key information and copying management information are stored in addition to main data such as user data. In this case, a disk on which data is previously recorded in the recording area by use of emboss pits indicates a reproduction-only optical disk.

Layout of Information Recording Area of Optical Disk:

In the recording area 102, key information for encrypting main data and copying management information for copying management of main data are stored in addition to main data. At this time, key information is formed by use of emboss key information. When main data encoded by use of key information is read out, the secret code of the main data is decoded by use of two information items of emboss key information and key information. In this case, if emboss key information obtained when key information is formed and emboss key information obtained at the time of reproduction do not coincide with each other, the secret code of the main data cannot be decoded.

Therefore, even when main data and key information are completely copied on another disk, the secret code of the main data cannot be decoded if the emboss key information items are different from each other.

Figure 2A:
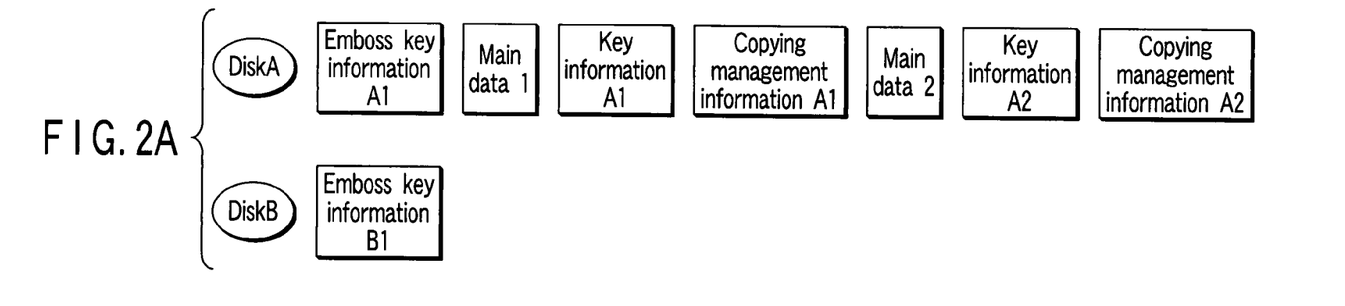
FIGS. 2A to 2C are explanatory diagrams for illustrating a main data moving method.
Figure 2B:
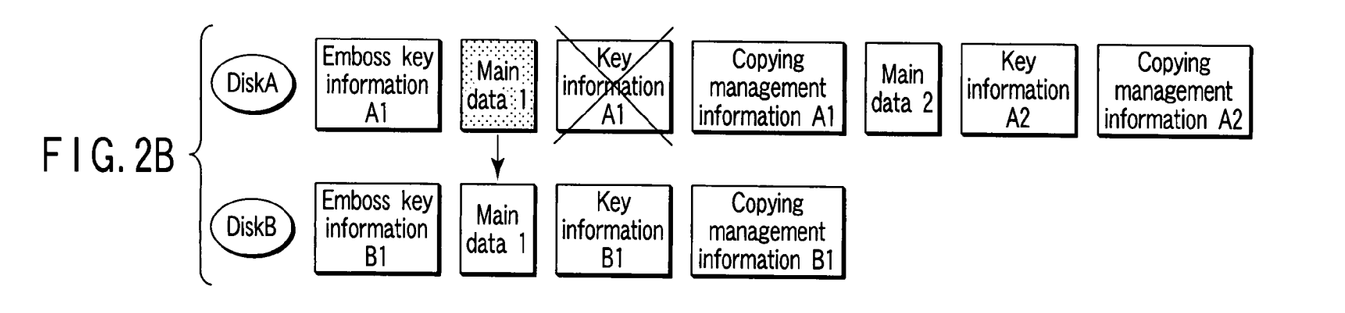
Figure 2C:
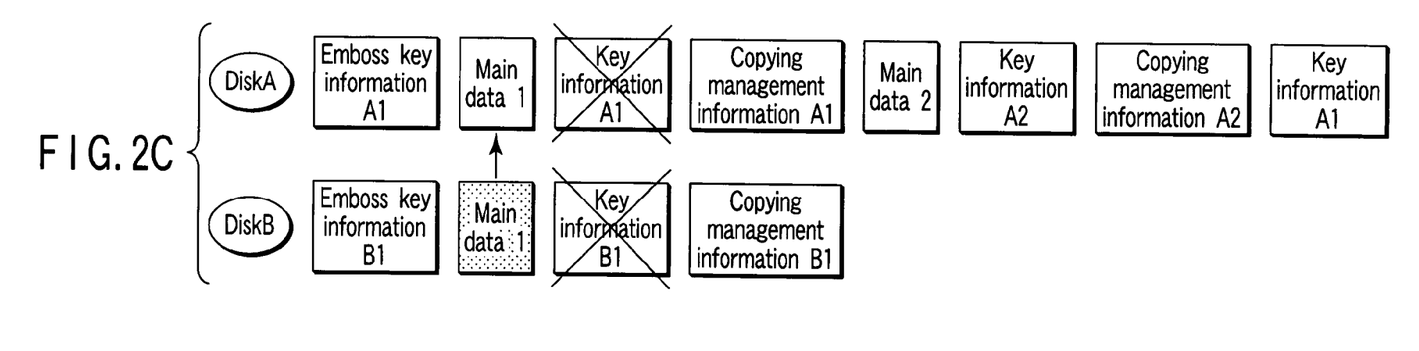
Figure 3:
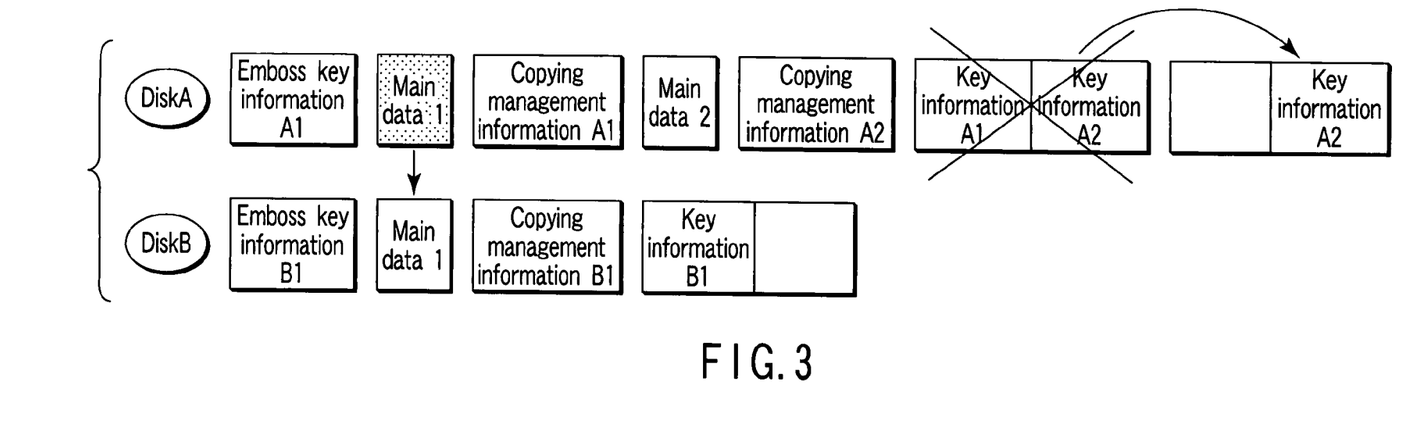
FIG. 3 is an explanatory diagram for illustrating a main data moving method.

A method for moving main data is explained with reference to FIGS. 2A to 2C. First, as shown in FIG. 2A, assume that main data items 1 and 2 are stored on a disk A. Key information items A1 and A2 formed by use of emboss key information A1 are stored on Disk A and the main data items 1 and 2 and copying management information items A1 and A2 are encrypting by the key information items A1 and A2.

Next, a case wherein the main data 1 is copied on Disk B which is a blank disk is explained with reference to FIG. 2B. Emboss key information B1 is previously stored on the disk B.

Information of the main data 1 is decoded once by use of key information of Disk A and converted into information which is not encoded. Then, when the above information is recorded on Disk B, the information is encoded and recorded according to emboss key information B1 and key information B1 formed based on the emboss key information B1. Further, copying management information B1 containing information such as information relating to the number of times of data movement, information compression rate/rate conversion information and key information A1 is encoded and recorded.

Next, the key information A1 of Disk A is completely erased. At this time, since key information A1 is no more present on Disk A, main data on Disk A cannot be reproduced. Further, main data on Disk B can be reproduced by use of emboss key information B1 and key information B1 and movement of the main data 1 is completed.

A method for returning the main data 1 of Disk B to Disk A is explained. When data is returned from Disk B to Disk A, it is confirmed that Disk A is a movement source with reference to the copying management information B1. Then, if it is confirmed that the main data remains on Disk A and key information A1 is restored based on the emboss key information B1 and recorded on Disk A. After this, the key information B1 is erased. Although not shown in the drawing, if the main data 1 of Disk A is already erased or destroyed, the main data 1 is recorded on Disk A again by use of the same procedure as that of FIG. 2B.

As another example, a moving method in a case where key information items of different main data items are stored in the same block is explained. In this case, the block is the minimum recording or erasing unit.

In a case wherein one main data is moved to a disk on which key information items for a plurality of main data items are stored in the same block, the following procedure is used. That is, the main data 1 is recorded on Disk B by the same procedure as that shown in FIG. 2B, key information B1 is formed and then key information A2 is recorded into another block before the key information of Disk A is erased. As a result, the main data 2 of Disk A can be decoded by use of the newly recorded key information A2 and the main data 1 of Disk B can be decoded by use of the key information B1.

Figure 4:
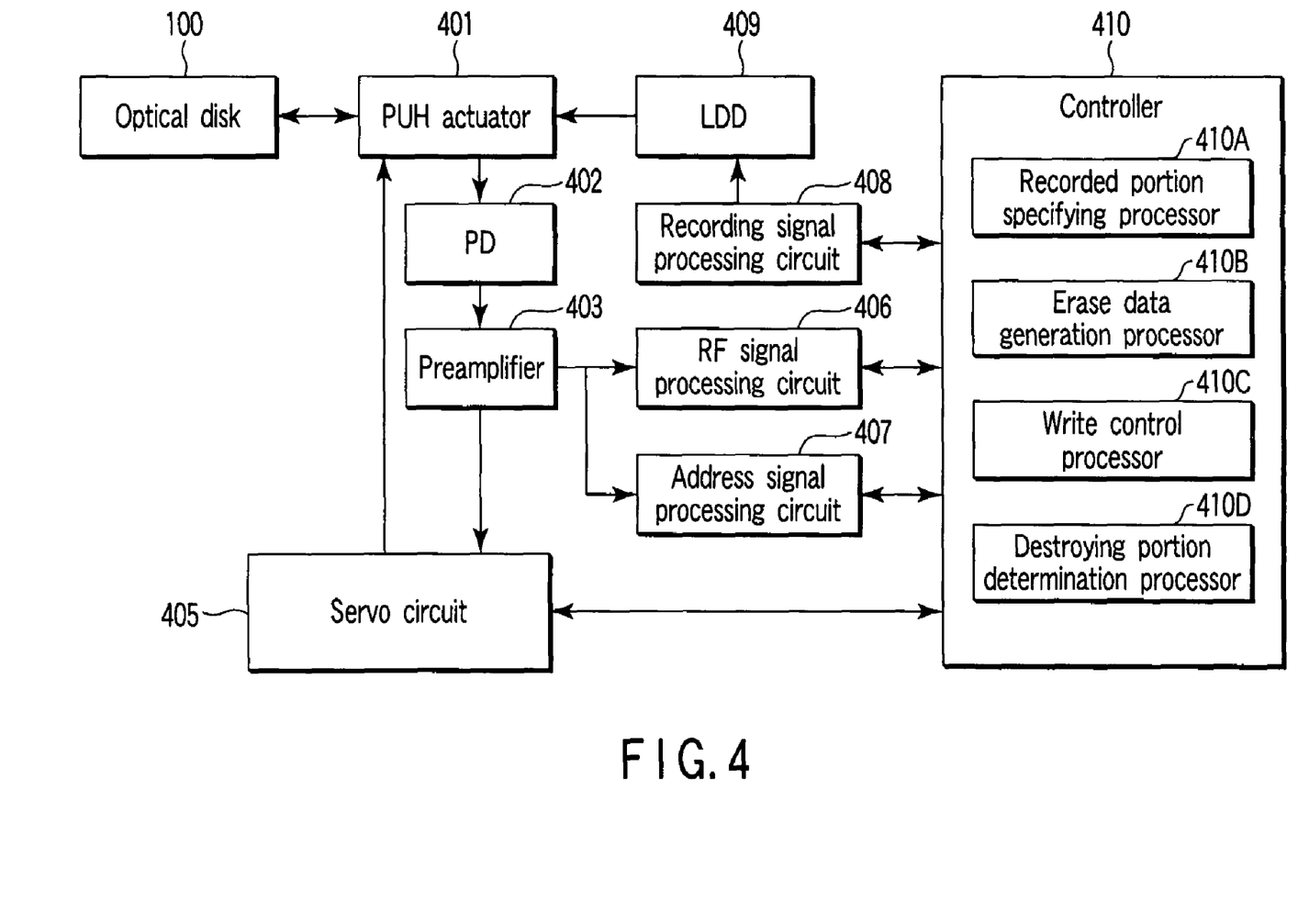
FIG. 4 is a diagram showing an example of the configuration of an optical disk recording/reproducing apparatus according to this invention.

Explanation for Optical Disk:

The configuration of an optical disk recording/reproducing apparatus according to one embodiment of this invention is shown in FIG. 4. The optical disk apparatus of this invention performs an information recording/reproducing operation by converging laser light emitted from a pickup head (PUH) 401 onto an information recording layer of the optical disk. Light reflected from the disk 100 transmits through an optical system of the PUH 401 again and is detected as an electrical signal by a photodetector (PD) 402. The detected electrical signal is amplified by a preamplifier 403 and output to a servo circuit 405, signal processing circuit 406 and address signal processing circuit 407.

In the servo circuit 405, servo signals for focusing, tracking or the like are generated and the respective signals are output to focusing and tracking actuators of the PUH 401.

In the processing circuits 406, 407, information items such as user data, management information and address information are extracted from a reproduced signal and output to a controller 410.

The controller 410 reads out data such as user data in a desired position and records user data and management information in a desired position based on address information. Further, the controller 410 can erase information of a recorded portion by accessing a desired position and overwriting specified data in the recorded portion based on address information.

A signal to be recorded is modulated into a recording waveform control signal suitable for recording on the optical disk 100 by use of a recording signal processing circuit 408. Based on the signal, a laser diode (LD) driving circuit (LDD) 409 causes a laser diode to emit light and records information on the optical disk 100. In the recording signal processing circuit 408 and LD driving circuit 409, the waveform for overwriting/erasing can be formed in addition to formation of the waveform for normal data recording and the waveforms are selectively switched according to an instruction by the controller 410. Further, the RF signal processing circuit 406 has not only a normal data reproducing function but also an erase data determination processing function which will be described later. The processing circuit performs the erase data determining process according to an instruction by the controller 410.

The controller 410 has various functions to control peripheral blocks. The controller 410 includes a recorded portion specifying processor 410A which specifies a recorded portion, erase data formation processor 410B, write processor 410C and destroyed portion determining processor 410D. The operations of the above units are described later in detail.

Figure 5:
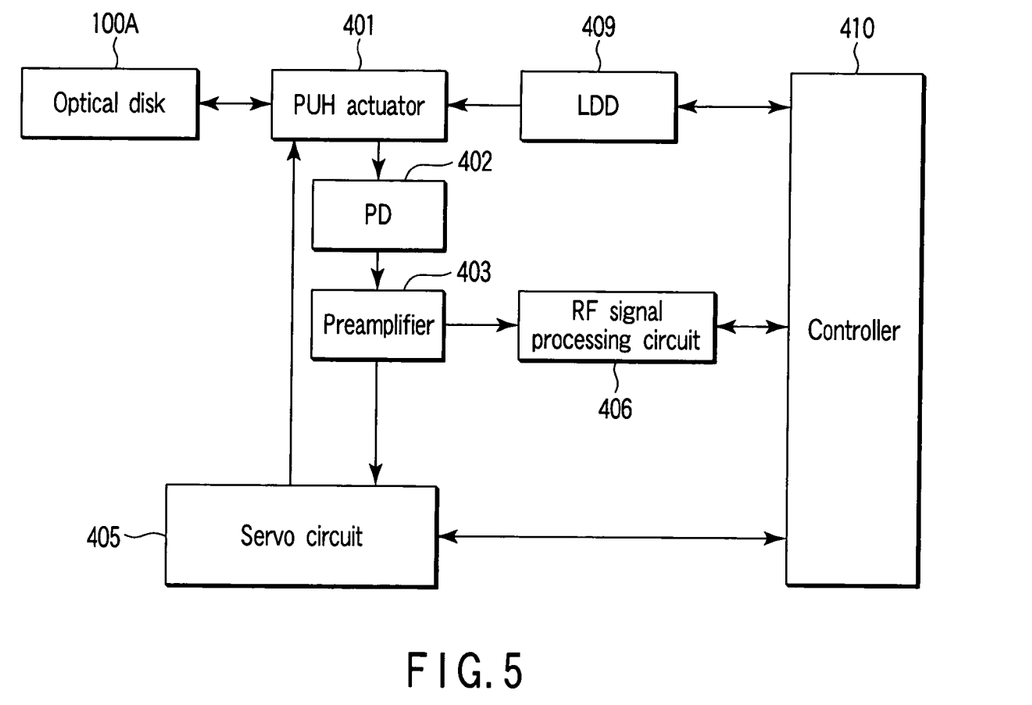
FIG. 5 is a diagram showing an example of the configuration of an optical disk reproduction-only apparatus.

The configuration of an optical disk reproduction-only apparatus according to one embodiment of this invention is shown in FIG. 5. Portions of FIG. 5 which are the same as those of FIG. 4 are denoted by the same reference symbols. Generally, address information is formed by use of pits at the same time of formation of user data on a reproduction-only disk 10A. Therefore, the address read operation is performed at the same time as reproduction of data by the RF processing circuit 406. The configuration corresponding to functions other than the recording function is the same as that in the recording/reproducing apparatus. However, in the reproduction-only apparatus, since it is assumed that the tracking control operation is generally performed only for emboss pits, a push-pull type tracking control function is not provided and only a DPD type tracking control function can be provided.

Explanation for Tracking Control:

Next, a tracking control method of the recording apparatus is explained. Generally, in the recording apparatus, a tracking control system such as a push-pull type or differential push-pull type tracking control system is provided in order to scan a beam along the groove of the optical disk.

Figure 6:
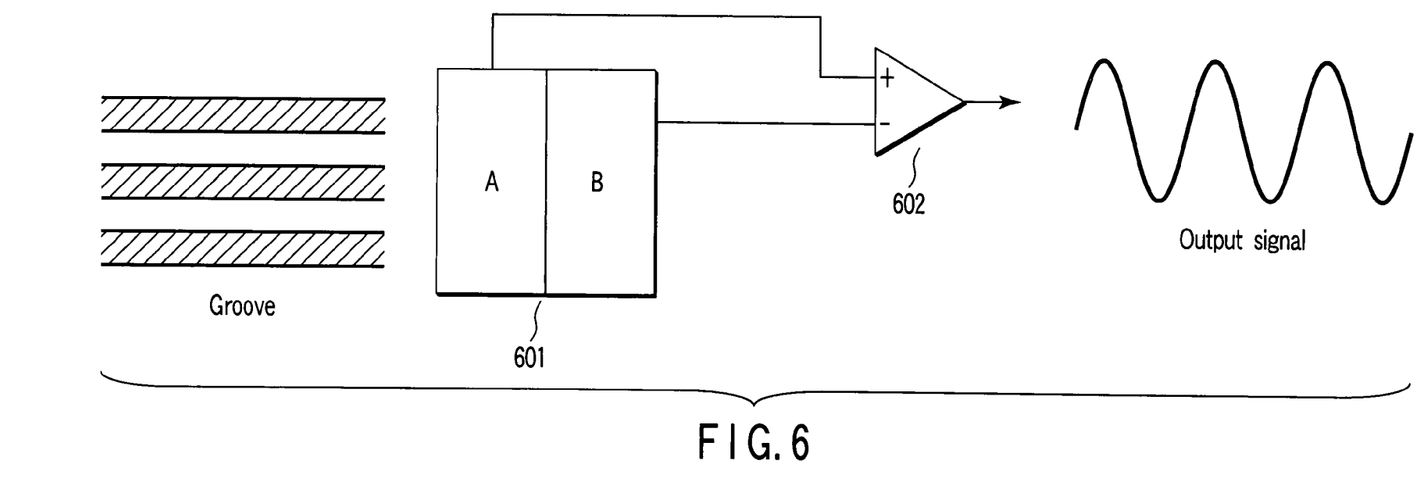
FIG. 6 is a schematic diagram showing a tracking servo signal generator.

FIG. 6 is a schematic diagram of a tracking servo signal generating device in order to perform a tracking process for the groove. The tracking servo signal generating device is basically configured by a two-divided PD 601 and subtracter 602. Light returned from the optical disk exhibits the symmetrical strength distribution when the beam scans the center of the groove. However, when the beam deviates from the center of the groove, one of the right and left strength distributions is lowered and the other strength distribution is raised. As a result, when a difference signal between signals of two divided PDs is observed, the output signal becomes zero if the beam lies at the center of the groove. The output signal has a certain value if the beam deviates from the center of the groove. Therefore, when the beam crosses the groove shown in FIG. 6, an output signal shown in FIG. 6 can be obtained. The output signal is used as a tracking servo signal.

Figure 7:
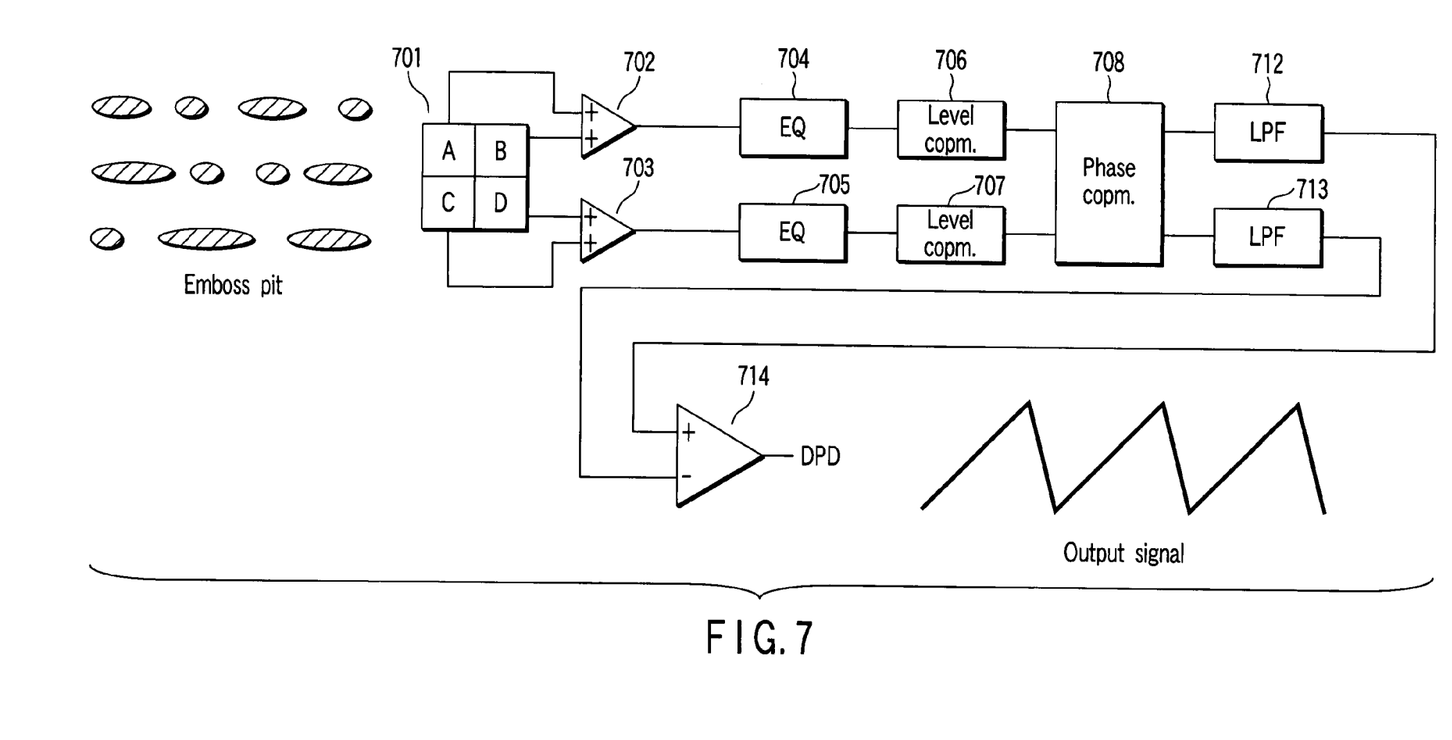
FIG. 7 is a schematic diagram showing a tracking servo signal generator of the reproduction-only apparatus.

Next, the tracking control operation of the reproduction-only apparatus is explained. Since the reproduction-only disk has no grooves and pits are formed with priority given to the quality of a sum signal, it becomes difficult to acquire a tracking servo signal by use of the difference signal. FIG. 7 is a schematic diagram of the tracking servo signal generating device of the reproduction-only apparatus. The apparatus is of the DPD type. In this type of apparatus, a four-divided PD 701 is used. Output signals of elements A, B of the four-divided PD 701 are added together in an adder 702, noise of the thus obtained sum signal is reduced in an equalizer (EQ) 704, and then the sum signal is binary-coded in a level comparator 706 and supplied to one input terminal of a phase comparator 708. Output signals of elements C, D of the four-divided PD 701 are added together in an adder 703, noise of the thus obtained sum signal is reduced in an equalizer (EQ) 705, and then the sum signal is binary-coded in a level comparator 707 and supplied to the other input terminal of the phase comparator 708. The comparison result is obtained as two output signals which are phase-inverted from each other, and the two output signals are filtered by low-pass filters 712, 713 and then supplied to a subtracter 714.

In the above circuit, when light returned from the pit is observed and if the beam scans the center of the pit or mark, output signals of substantially the same phase are obtained from the PD elements A, B, C, D of the four-divided PD 701. However, if the beam deviates from the center of the pit, the phases of the signals output from the elements A, D and the phases of the signals output from the elements B, C gradually deviate from each other. Therefore, by detecting the phase deviation amount, deviation from the center of the track can be detected. In the apparatus shown in FIG. 7, the output signals of the PD corresponding to the amplitude component of a short mark is amplified by the equalizer (EQ) and binary-coded by the level comparator. Further, the phases of the output signals of the elements A, D and the output signals of the elements B, C are compared by the phase comparator 708 to form a tracking servo signal. Thus, in the tracking servo signal generating circuit of the reproduction-only apparatus, since it is necessary to detect a variation in the signal with time, the tracking control operation cannot be performed with respect to an optical disk with the configuration in which a signal always set at a constant level in the case of a groove is output, for example.

Figure 8:
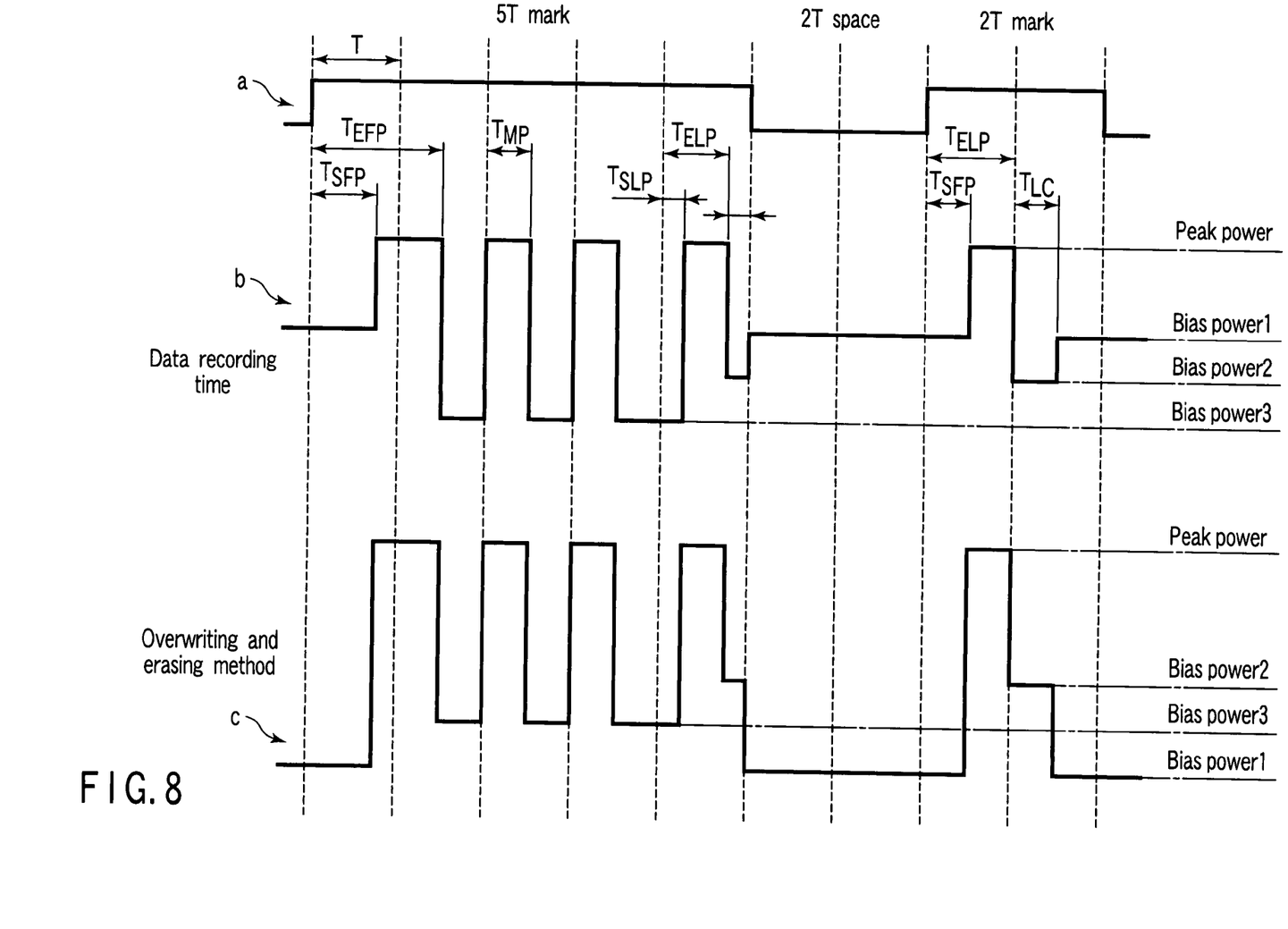
FIG. 8 is an explanatory diagram showing an example of recording signals and recording waveforms for illustrating the function and operation of this invention.

Recording Waveform:

The recording waveform according to one embodiment of this invention is explained with reference to FIG. 8. Generally, a recording waveform "b" is used for a recording signal "a" of FIG. 8 at the time of data recording. In the recording waveform "b", it is necessary in some cases to apply laser light with relatively high strength to a space portion (space period 2T) in which no recording mark is formed. This operation is performed so as to make it possible to stably form recording marks by heating the medium. However, when information is overwritten and erased, an original recording signal is maintained in the space portion. Further, laser light with the strength which is equal to or less than the application strength of laser light at the time of reproduction is applied to the space portion (space period 2T) as shown by a recording waveform "c" in order to acquire a stable DPD signal after overwriting and erasing (that is, in order to acquire a signal for tracking). In this case, Peak power and Bias power 1, 2, 3 indicate the strength.

Figure 9:
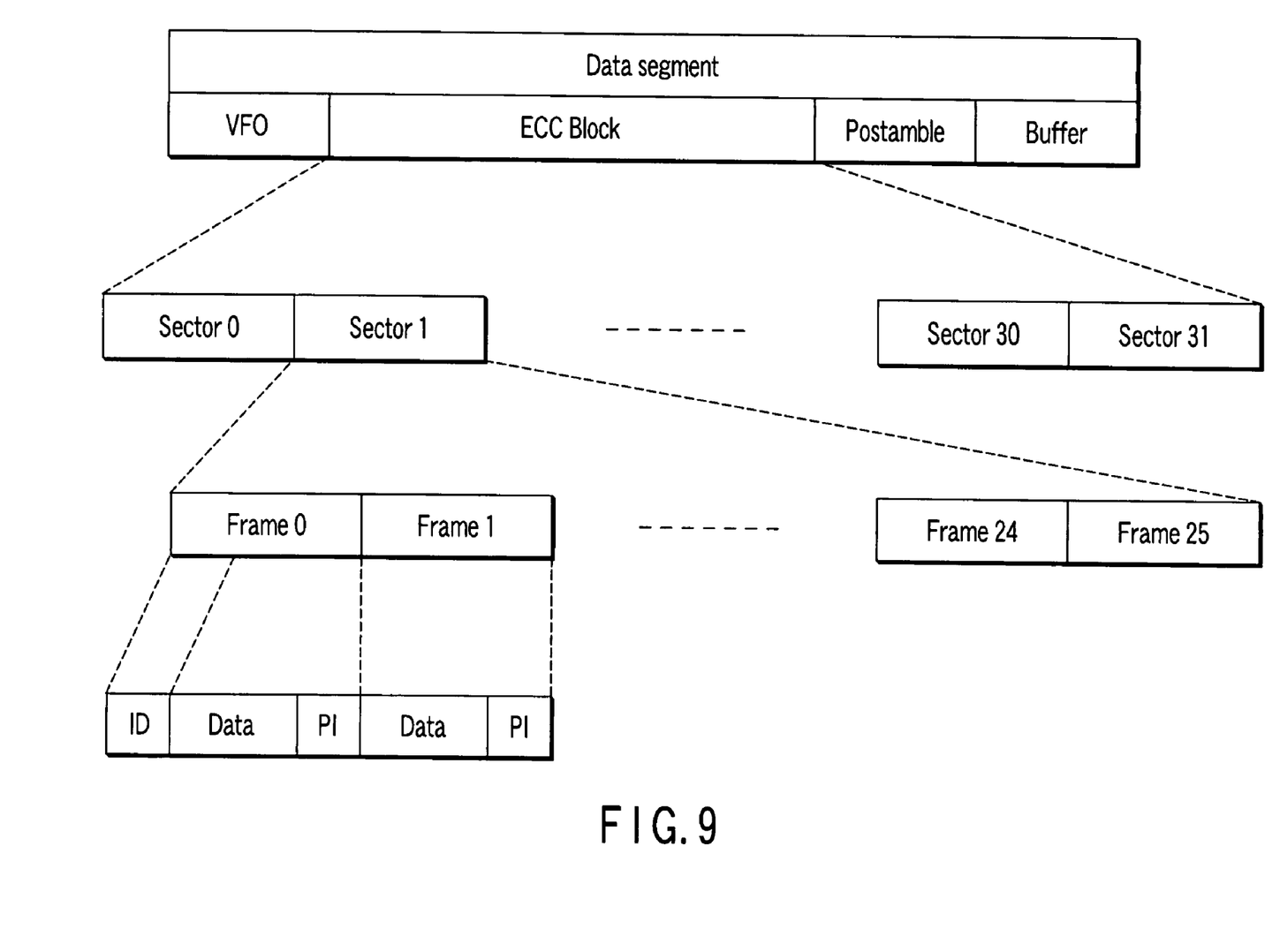
FIG. 9 is an explanatory diagram showing an example of the data structure of data recorded on the optical disk.

Data Structure:

Next, the data structure of data recorded on the optical disk is explained with reference to FIG. 9. Data is recorded on the optical disk in the unit which is referred to as a data segment. In the data segment, for example, a variable frequency oscillator (VFO) which causes a phase locked loop (PLL) to be operated, a postamble indicating the end of user data and a buffer may be contained in addition to user data. User data is stored in a data field. The data field is divided into a plurality of sectors and each sector is divided into a plurality of frames. In a frame "0", an ID of a sector of the reproduction-only apparatus in which an address and attribute of data are stored and a correction code for correction process are recorded in addition to user data. In other frames, user data items and correction codes are recorded. Information of one ECC block which is one unit of error correction is stored in the data field.

Figure 10A:
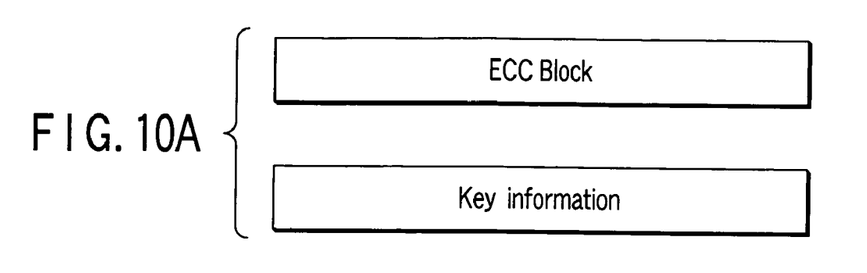
FIGS. 10A, 10B are explanatory diagrams for illustrating an example of a key information storage method according to this invention.
Figure 10B:
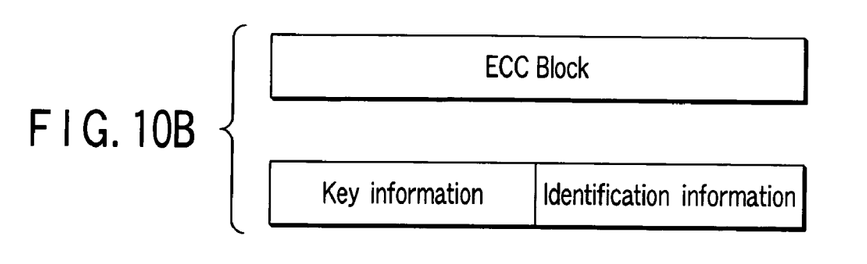

Storage Method of Key Information:

As shown in FIG. 10A, one key information is stored for each data segment in some cases. Further, as shown in FIG. 10B, actual key information and identification information indicating that key information is stored in a data segment are stored in combination in part of one data segment in other cases.

Figure 11A:
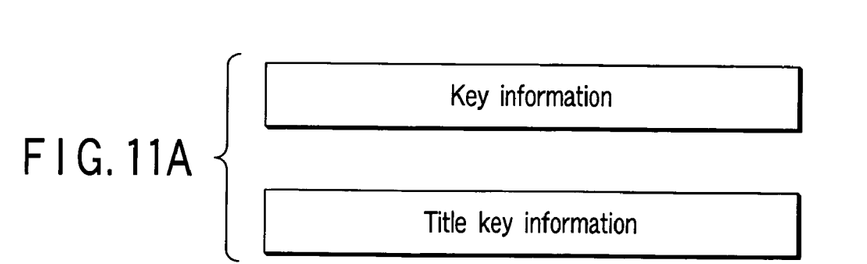
FIGS. 11A, 11B are explanatory diagrams for illustrating another example of the key information storage method according to this invention.
Figure 11B:
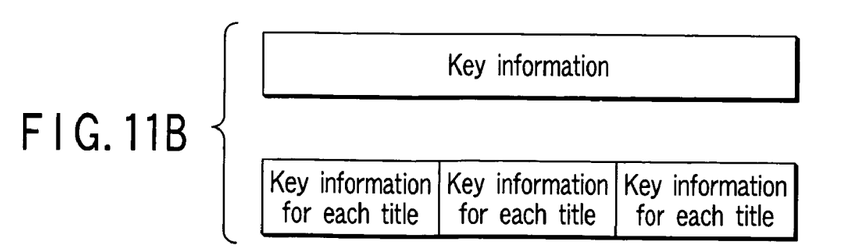

As shown in FIG. 11A, each key information corresponds to key information for one main data title) in some cases. Further, as shown in FIG. 11B, each key information includes key information items for a plurality of main data items (titles) in other cases.

Data Erasing Method:

Since the recording layer of the write once read many disk is formed to permit the recording operation to be performed only once, data in an overwriting portion is destroyed and cannot be reproduced when data is overwritten. In this invention, the following pattern is overwritten to destroy information and maintain a signal for tracking such as a DPD signal.

Erasing Method A: Dummy data which is subjected to the same modulation process as main data is overwritten. When a long space is present in data at the time of overwriting, the corresponding portion is not locally overwritten and the previous signal remains. Generally, since a long space always appears in the modulated signal with a constant probability, information is not overwritten in this portion and the DPD signal occurs correctly. Since the tracking servo using the DPD signal has sufficiently small bandwidth in comparison with the record information reproducing system, the correct operation can be performed even if the signal is intermittently generated.

Since the recording signals in portions other than the long spaces are overwritten, an information read operation cannot be performed. That is, information is completely erased.

Erasing Method B: A specified pattern which contains a run length code longer than half a modulation area used for recording user data and in which the total sum of the run lengths exceeds ⅓ of the run length of the whole pattern is overwritten. For example, in the case of a modulation system in which main data is modulated based on (1, 10)RLL modulation, a pattern of 10T-10T-4T is used. T indicates the period of a basic clock. Since the pattern is configured by an odd number of codes, the recording operation is performed in a sequence of a 10T mark, 10T space, 4T mark, 10T space, 10T mark and 4T space. Further, if the above pattern is overwritten, the DPD signal can be acquired in the 10T space portion even after overwriting. Therefore, the DPD signal can be acquired in the range of 5/12 of the erasing portion and the tracking operation can be performed without fail after overwriting.

Erasing Method C: Successive patterns having the shortest run length in the modulation area used for recording user data are overwritten. For example, in the case of a modulation system in which main data is modulated based on (1, 10)RLL modulation, successive signals of 2T are recorded. In this case, the original recording signal is completely destroyed and the amplitude of the reproduction signal becomes small. Therefore, the quality of the DPD signal is significantly lowered and it becomes impossible to perform the overwriting operation over a long segment. However, the DPD signal can be acquired by restricting the overwriting range as will be described later.

As described above, in the management method of this invention, recorded data is destroyed by overwriting and recording data modulated in a modulation system of the same run length restriction as the run length restriction of the modulation system used for recording data in a write once read many optical disk. Further, in another method, recorded data is destroyed by overwriting and recording data by use of patterns in which the frequency of occurrence of spaces of the longest code is higher than the frequency of occurrence of the modulation system used for recording data based on the modulation system of the same run length restriction as the run length restriction of the modulation system used for recording data. Further, in still another method, recorded data is destroyed by overwriting and recording data by use of successive patterns of the shortest code in the run length restriction of the modulation system used for recording data.

Figure 12A:
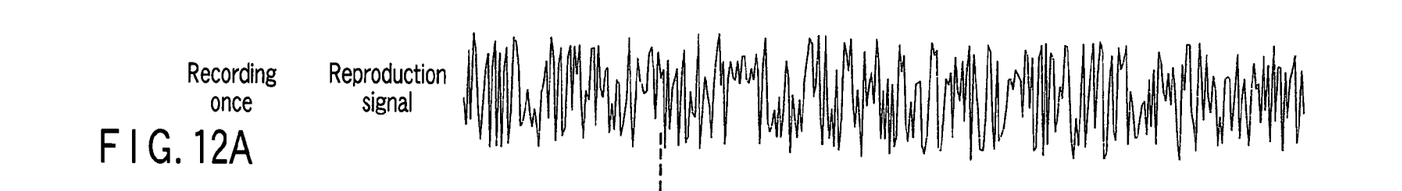
FIGS. 12A to 12D are explanatory diagrams showing various examples of recording patterns overwritten for erasing reproduction signals of signals which are originally recorded on the optical disk.
Figure 12B:
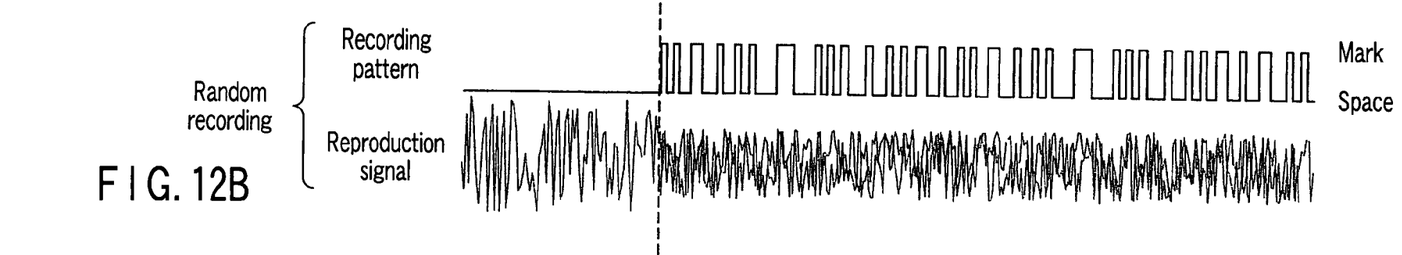
Figure 12C:
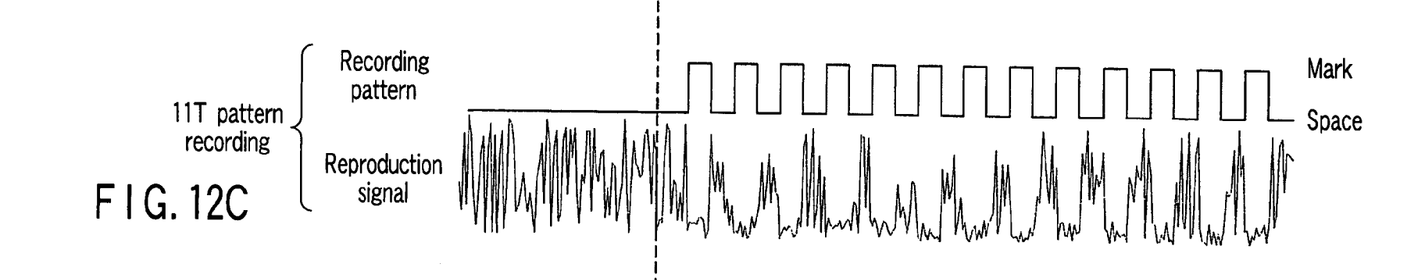
Figure 12D:
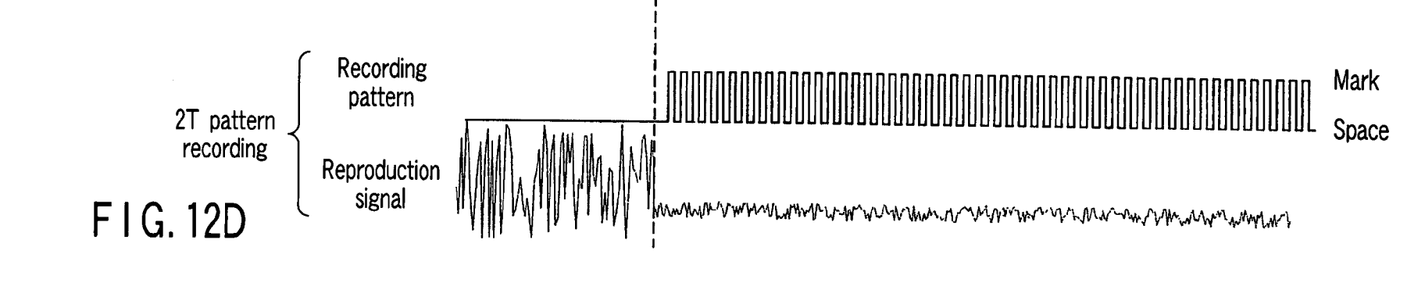

In FIG. 12A, a reproduction signal of a signal which is originally recorded is shown. Further, in FIGS. 12B to 12D, various examples of a recording pattern overwritten for erasing are shown.

Figure 13:
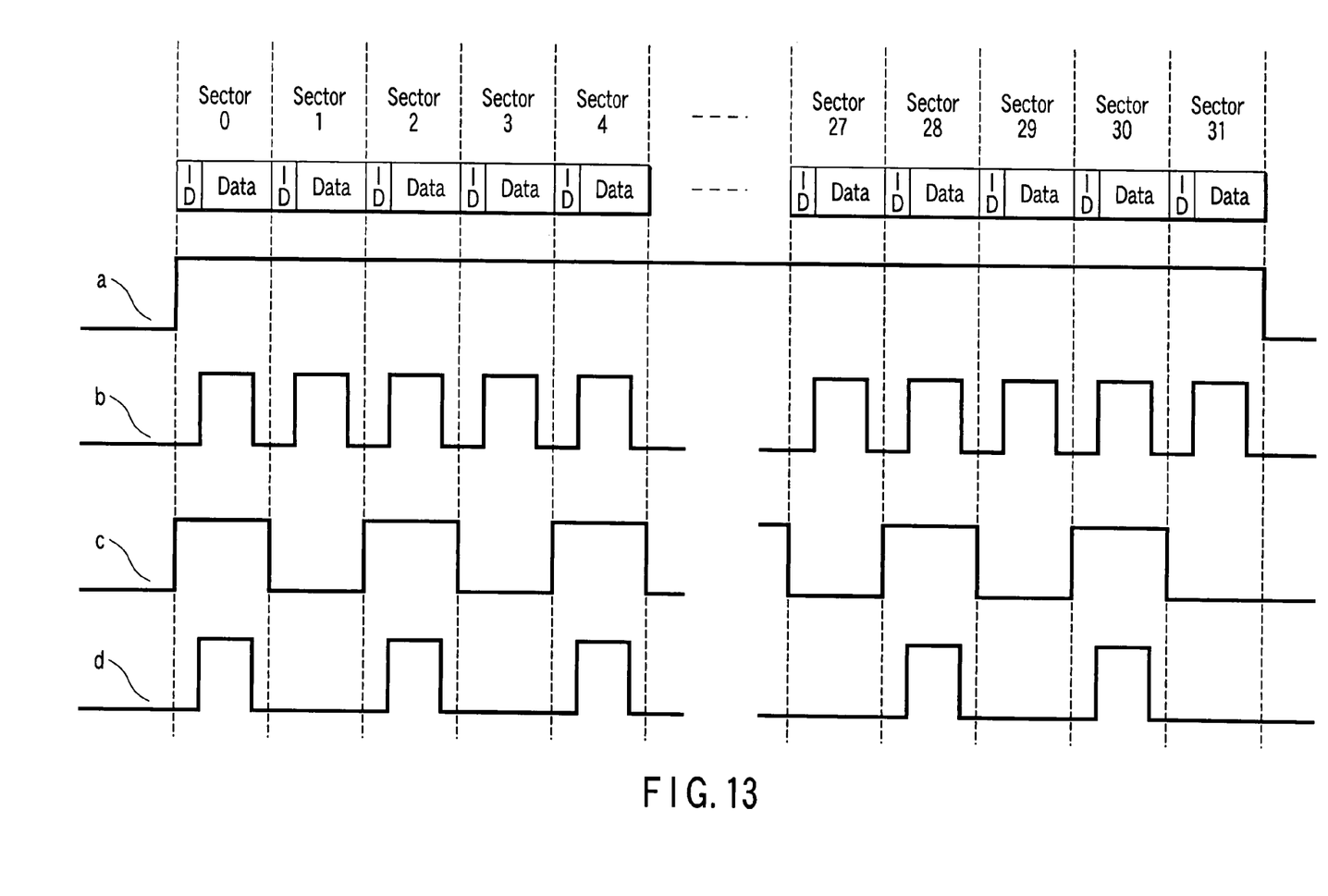
FIG. 13 is an explanatory diagram showing various example of gate signals used to output erase signals with respect to data.

Data Erasing Range:

Next, the overwriting range is explained. For example, the overwriting operation is controlled by use of a gate signal a, b, c or d as shown in FIG. 13. That is, data is recorded in block units. When data is destroyed by overwriting and recording, the recording/non-recording period is controlled by use of a unit smaller than the block to set part of the block into a destroyed state (the entire portion is not destroyed).

Overwriting Range a: Data segments which contain key information are all overwritten (gate signal of FIG. 13a). Thus, original information can be erased without fail. However, since the DPD signal is not output in a long range in erasing method C, it is not preferable to use the range a.

Overwriting Range b: A data portion of each sector is overwritten (gate signal b of FIG. 13). Since address information and attribute information of the data are contained in an ID portion, it becomes possible to acquire an address and confirm the attribute of the data by leaving the ID portion. Therefore, a stable address searching operation can be performed even after overwriting and erasing.

Overwriting Range c: The overwriting operation is performed for every two sectors (gate signal c of FIG. 13). Since the recording/non-recording period is generally controlled in sector units, the overwriting process can be performed more easily if the control process is performed in sector units. Further, since ID portions are alternately left behind and address information can be acquired, an address can be stably reproduced by a complementary process. Since the reduction of the DPD signal in each process is small even when erasing method C is used, a relatively stable tracking process can be performed.

Overwriting Range d: The overwriting operation is performed for every two data portions of the sectors (gate signal d of FIG. 13). Since the ID portion of the sector can be read as in the case of overwriting range b and the reduction of the DPD signal in each process is small even when erasing method C is used, a relatively stable tracking process can be performed.

Determination of Erased Data:

Next, determination of erased data is explained. In the optical disk, recorded data may be destroyed very rarely by the influence of scratches or finger-prints on the disk in some cases. In the reproduction process of the optical disk, it is necessary to distinguish data which is thus destroyed and cannot be read out from data which is overwritten and erased. Therefore, in the optical disk and optical disk apparatus of this invention, a rule which determines erased data is previously defined.

Determination Method A: Specified frequency information is detected. When the data overwriting and erasing operation is performed by using the specified pattern as in erasing method B, a reproduction signal causes a signal level variation or amplitude variation in a specified pattern. Since the above pattern is not generated due to the presence of scratches of the disk, the erased data area can be determined by detecting the specified pattern. Further, when erasing method C is applied to overwriting range c or overwriting range d, a variation in the signal amplitude or signal level of a constant range occurs. Therefore, by detecting the variation, the erased data area can be determined. Specifically, the determination of the data area can be made by measuring the timing of the amplitude variation, measuring the timing of asymmetry variation, detecting the specified frequency in the pattern or the like.

Figure 14:
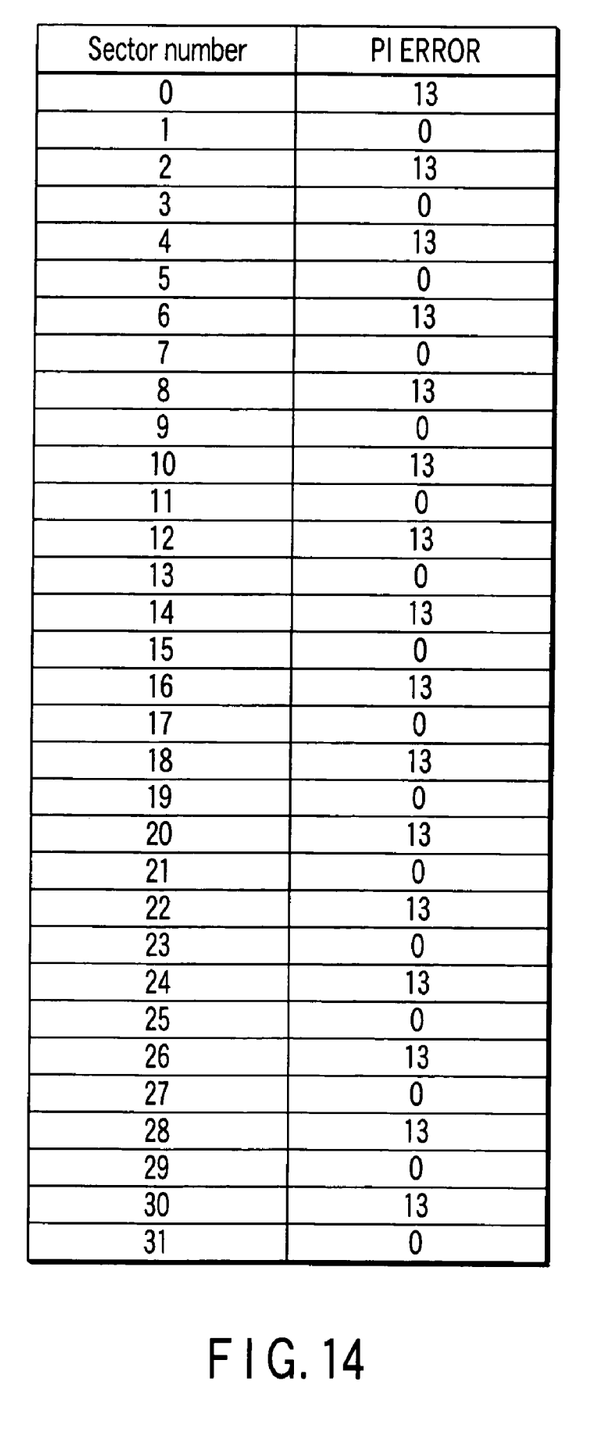
FIG. 14 is an explanatory diagram showing an example of a pattern of a PI error of demodulation data when a data erasing process is performed.

Determination Method B: When the erase switching operation is performed in sector units as in overwriting range c or overwriting range d, a PI (inner parity) error of demodulated data occurs in a portion where data is erased and does not occur in the other portion as shown in FIG. 14. It is rare that errors are distributed in the manner described above due to the presence of scratches of the disk. Therefore, the erased data can be determined based on the distribution of the PI errors.

As described above, in the above embodiments, an information management method which detects the amplitude pattern and determines and specifies a destroyed portion and an information management method which detects the asymmetry variation pattern and determines and specifies the destroyed portion are provided. Further, an information management method which detects the error occurring pattern and determines and specifies the destroyed portion is also provided. The technique for destroying only key information by overwriting a signal when main information containing user data is encrypted by use of key information so as to make it impossible to read the main information is contained in the range of this invention.

In the above explanation, much attention is paid to the fact that only key information is overwritten and erased. However, information other than the key information can be overwritten and erased by use of the technique of this invention and the tracking control operation for the erased portion can be performed by use of the reproduction-only apparatus. Therefore, when main data is not utilized again, main data itself can be overwritten and erased.

Further, in order to destroy recorded data of the write-once type recordable optical disk, the above embodiments have a feature as an apparatus having one of (a) means for overwriting data modulated in a modulation system of the same run length restriction as the run length restriction of the modulation system used for recording data, (b) means for overwriting data by use of patterns in which the frequency of occurrence of spaces of the longest code is higher than the frequency of occurrence of the modulation system used for recording data based on the modulation system of the same run length restriction as the run length restriction of the modulation system used for recording data, and (c) means for overwriting data by use of successive patterns of the shortest code in the run length restriction of the modulation system used for recording data.

Further, in the above embodiments, the information recording/reproducing apparatus for the write-once type recordable optical disk includes means for specifying a recorded portion of the write-once type recordable optical disk, means for generating erasing data modulated in a modulation system of the same run length restriction as the run length restriction of the modulation system used for recording data, and means for applying laser light based on the erasing data to the recorded portion and destroying the recorded data.

Further, in the above information recording/reproducing apparatus, the means for generating the erasing data includes means for generating erasing data of patterns in which the frequency of occurrence of spaces of long codes is higher than the frequency of occurrence of the modulation system used for recording data.

In the above information recording/reproducing apparatus, the means for generating the erasing data includes means for using successive patterns of the shortest code in the run length restriction of the modulation system used for recording data. Further, in the above information recording/reproducing apparatus, the means for specifying the recorded portion includes means for specifying a recorded portion in which data is recorded in block units in the data area of the write-once type recordable optical disk (means for specifying a recorded portion of recorded data in the data area of the R-disk, where the recorded data is configured by block units). In addition, the means for generating the erasing data includes means for generating erasing data in which the recording/non-recording segment is changed in the unit smaller than the block unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information management method for write-once type recordable optical disk comprising:

specifying a recorded portion of the write-once type recordable optical disk, generating erasing data modulated in a modulation system of the same run length restriction as run length restriction of a modulation system used for recording data, and applying laser light based on the erasing data to the recorded portion and destroying recorded data.

2. The information management method for the write-once type recordable optical disk according to claim 1, wherein the generating the erasing data includes generating erasing data of a pattern in which a frequency of occurrence of spaces of long codes is higher than a frequency of occurrence of a modulation system used for recording data.

3. The information management method for the write-once type recordable optical disk according to claim 1, wherein the generating the erasing data includes using successive patterns of the shortest code in the run length restriction of the modulation system used for recording data.

4. The information management method for the write-once type recordable optical disk according to claim 1, wherein the specifying the recorded portion includes specifying a recorded portion of recorded data in the data area of the write-once type recordable optical disk, where the recorded data is configured by block units, and the generating the erasing data includes generating erasing data in which a recording/non-recording segment is changed in units smaller than the block units.

5. The information management method for the write-once type recordable optical disk according to claim 1, further comprising:

determining a destroyed portion of the recorded data, wherein the determining includes detecting an amplitude pattern of a reproduction signal reproduced from the optical disk and specifying a reproduction signal portion of the amplitude pattern as a destroyed portion when the amplitude pattern corresponds to a preset erase pattern.

6. The information management method for the write-once type recordable optical disk according to claim 1, further comprising:

determining a destroyed portion of the recorded data, wherein the determining includes detecting an asymmetry variation pattern of a reproduction signal reproduced from the optical disk and determining a destroyed portion.

7. The information management method for the write-once type recordable optical disk according to claim 1, further comprising:

determining a destroyed portion of the recorded data, wherein the determining includes performing an error correction process of a reproduction signal reproduced from the optical disk, detecting an error occurrence pattern and determining a destroyed portion.

8. The information management method for the write-once type recordable optical disk according to claim 1, wherein the applying the laser light based on the erasing data to the recorded portion and destroying the recorded data includes encrypting main information containing user data by use of key information to make it impossible to read out the main information and destroying only the key information by overwriting the erasing data.

9. A write-once type recordable optical disk comprising:

a recording area for recording data wherein one of (a) data modulated by a modulation system of the same run length restriction as run length restriction of a modulation system used for recording data, (b) data of patterns in which a frequency of occurrence of spaces of long codes is higher than a frequency of occurrence of the modulation system used for recording data based on the modulation system of the same run length restriction as the run length restriction of the modulation system used for recording data, and (c) data of successive patterns of the shortest code in the run length restriction of the modulation system used for recording data is overwritten to set recorded data into a destruction state on the optical disk.

10. An information management apparatus for a write-once type recordable optical disk comprising:

means for specifying a recorded portion of the write-once type recordable optical disk, means for generating erasing data modulated by a modulation system of the same run length restriction as run length restriction of a modulation system used for recording data, and means for applying laser light based on the erasing data to the recorded portion and destroying recorded data.

11. The information management apparatus for the write-once type recordable optical disk according to claim 10, wherein the means for generating the erasing data includes means for generating erasing data of a pattern in which a frequency of occurrence of spaces of long codes is higher than a frequency of occurrence of a modulation system used for recording data.

12. The information management apparatus for the write-once type recordable optical disk according to claim 10, wherein the means for generating the erasing data includes means for using successive patterns of the shortest code in the run length restriction of the modulation system used for recording data.

13. The information management apparatus for the write-once type recordable optical disk according to claim 10, wherein the means for specifying the recorded portion includes means for specifying a recorded portion of recorded data in the data area of the write-once type recordable optical disk, where the recorded data is configured by block units, and the means for generating the erasing data includes means for generating erasing data in which recording/non-recording segments are changed in units smaller than the block units.

* * * * *